March 26, 1963    J. R. ELWELL    3,083,031
ANTI-LASH GEARING FOR STEERING MECHANISM
Filed June 13, 1960    3 Sheets-Sheet 1

JOHN R. ELWELL
*INVENTOR.*

BY John R. Faulkner
Keith L. Zerschling
ATTORNEYS

March 26, 1963  J. R. ELWELL  3,083,031
ANTI-LASH GEARING FOR STEERING MECHANISM
Filed June 13, 1960  3 Sheets-Sheet 2
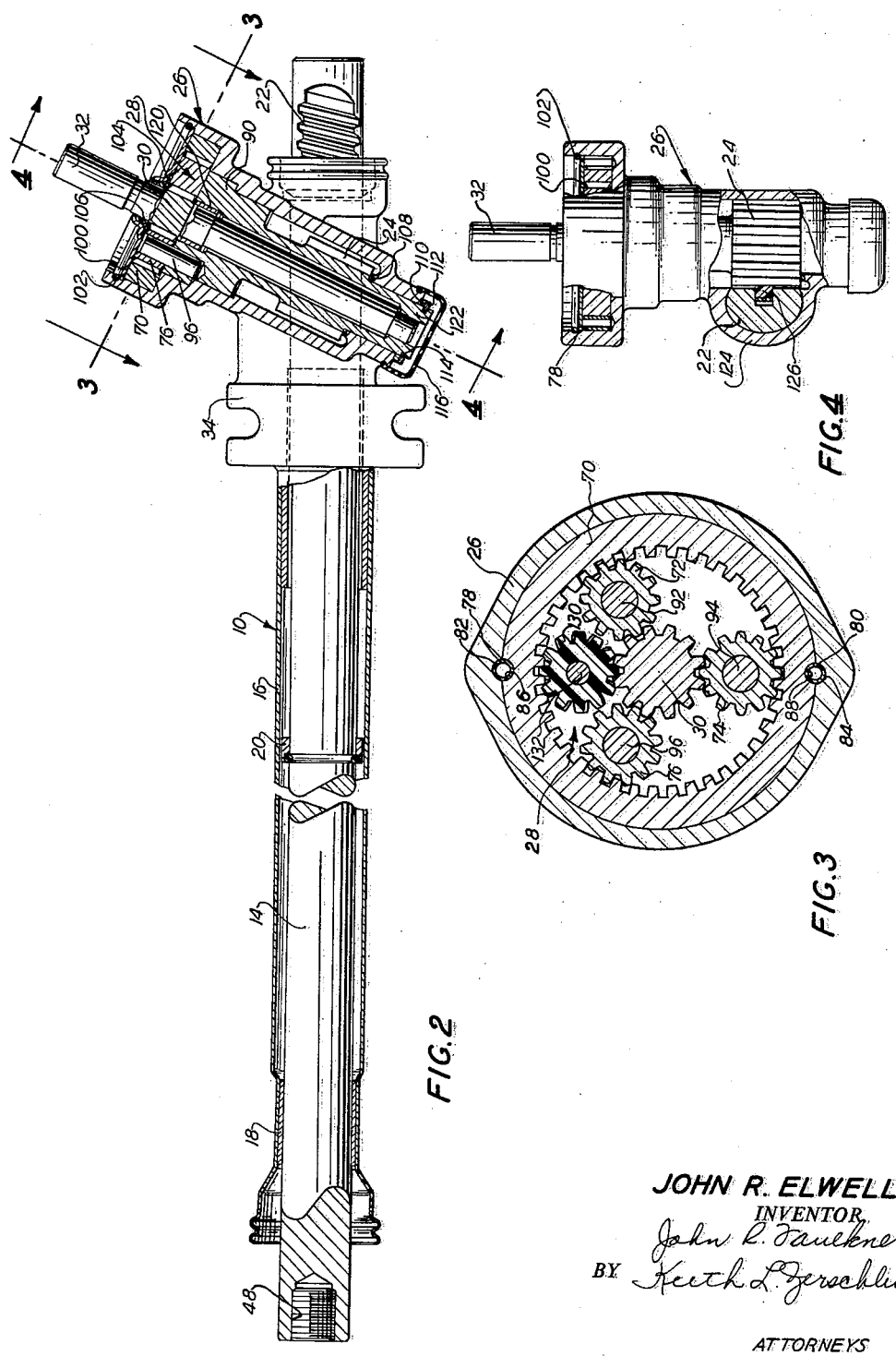
JOHN R. ELWELL
INVENTOR
BY *John R. Faulkner*
*Keith L. Zerschling*
ATTORNEYS March 26, 1963   J. R. ELWELL   3,083,031
ANTI-LASH GEARING FOR STEERING MECHANISM
Filed June 13, 1960   3 Sheets-Sheet 3
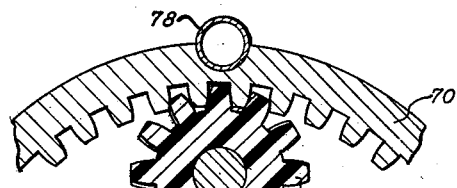
FIG.5
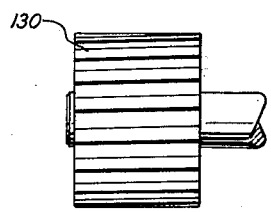
FIG.6
FIG.7
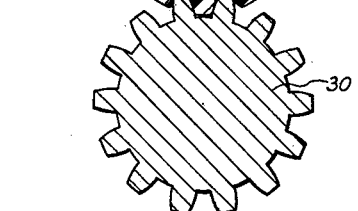
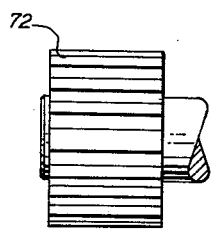
FIG.9
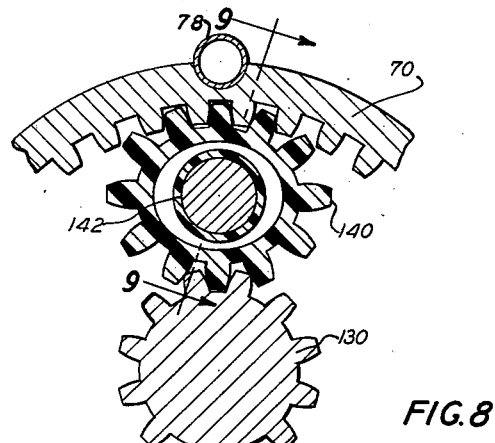
FIG.8
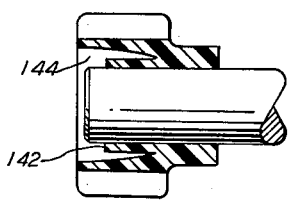
FIG.10
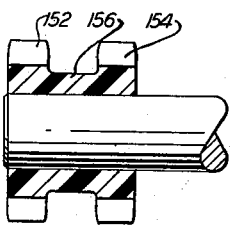
FIG.11
JOHN R. ELWELL
INVENTOR.
BY John R. Faulkner
Keith L. Zerschling
ATTORNEYS

United States Patent Office 3,083,031
Patented Mar. 26, 1963

3,083,031
ANTI-LASH GEARING FOR STEERING
MECHANISM
John R. Elwell, Dearborn, Mich., assignor to Ford Motor
Company, Dearborn, Mich., a corporation of Delaware
Filed June 13, 1960, Ser. No. 35,805
10 Claims. (Cl. 280—96)

This invention relates to a means for eliminating lash in a planetary gear train and to a steering mechanism for an automotive vehicle employing a planetary gear train that incorporates this lash eliminating means.

In commercially produced planetary gear trains, a certain amount of clearance between the teeth of the gears results because of the manufacturing tolerances that must be permitted. The tolerances permitted result in lash between the teeth of the planet gears and the teeth of the ring gear and between the teeth of the planet gears and the teeth of the sun gear. The lash described produces undersirable characteristics in mechanisms employing planetary gear trains and particularly in steering mechanisms employing planetary gear trains.

In steering mechanisms the lash between the gears employed should be reduced to a minimum if precise steering is desired. A good steering mechanism should produce an output which instantaneously follows the input from the steering wheel. If lash is permitted between the gears of the steering mechanism, however, the motor vehicle operator may be able to move the steering wheel a certain amount, without affecting the position of the steerable wheels of the vehicle. This is commonly called steering wheel play, and this play results in undesirable and often dangerous steering characteristics particularly when the steerable wheels of the vehicle are in the straight ahead position.

Lash in the gears of the steering mechanism also results in road shocks and other vibrations being transmitted more noticeably from the steerable wheels and other steering mechanisms back to the steering wheel of the motor vehicle. These vibrations and shocks cause driver fatigue and may make the vehicle difficult to control.

The present invention eliminates lash in a planetary gear train by providing a planet gear that has an interference fit with the ring and sun gears of the gear train and is constructed of a material having a substantially smaller modulus of elasticity and rigidity than the material of the other gears in the gear train. In the preferred embodiment of the invention this planet gear is constructed of a nonmetallic material, such as, nylon and has a different helix angle from the remainder of the planet gears and the sun and ring gears. For example, the sun gear, the ring gear and the planet gears may be straight spur gears while the nylon planet gear may be a helical gear having a slight helix angle. This planet gear will carry the load for small torques but when large torques are applied, the gear deflects sufficiently to permit the remainder of the planet gears to carry the load.

This invention is particularly advantageous in a steering mechanism of an automotive vehicle employing a planetary reduction gear train between the steering wheel and the steerable or dirigible wheels. When the steerable or dirigible wheels are in the straight ahead position and the vehicle is moving at a moderate or high rate of speed, the steering effort that is needed to turn the dirigible or steerable wheels of a vehicle is quite small. In this case the nonmetallic planet gear is capable of transmitting the torque from the steering wheel to the steerable or dirigible wheels of the vehicle. At relatively low speeds or when hard turns are accomplished, the torque needed to turn the steerable wheels of an automotive vehicle is quite high and in this case the nonmetallic planet gear deflects sufficiently to permit the other planet gears to transmit the torque from the steering wheel to the steerable wheels. The nonmetallic gear thus eliminates the lash in the planetary gear train and eliminates play in the steering wheel.

An object of the invention is the provision of means for eliminating lash in a planetary gear train.

Another object of the invention is the provision of a steering mechanism for an automotive vehicle in which lash is eliminated from the gear train employed.

A further object of the invention is the provision of a steering mechanism for an automotive vehicle in which play in the steering wheel is substantially eliminated.

Other objects and attendant advantages of the invention will become more readily apparent as the specification is considered in connection with the attached drawings in which:

FIG. 2 is a longitudinal sectional view, partially in elevation of a portion of the steering mechanism of the present invention;

FIG. 3 is a cross-sectional view taken along the lines 3—3 of FIG. 2;

FIG. 4 is a sectional view partially in elevation taken along the lines 4—4 of FIG. 2;

FIG. 5 is an enlarged view of a portion of FIG. 3 showing the configuration of the lash eliminating planet gear of the present invention and how this gear engages the sun and planet gears;

FIG. 6 is an elevational view of the lash eliminating planet gear shown in FIGS. 3 and 5;

FIG. 7 is an elevational view of a metallic planet gear employed with this invention;

FIG. 8 is a sectional view of another embodiment of the lash eliminating means of the present invention;

FIG. 9 is a sectional view of the lash eliminating planet gear shown in FIG. 8 taken along the lines 9—9 of this view;

FIG. 10 is a sectional view of another embodiment of the lash eliminating means of this invention, and FIG. 11 is a sectional view of the lash eliminating planet gear shown in FIG. 10 taken along the lines 11—11 of FIG. 10.

Figure 1:
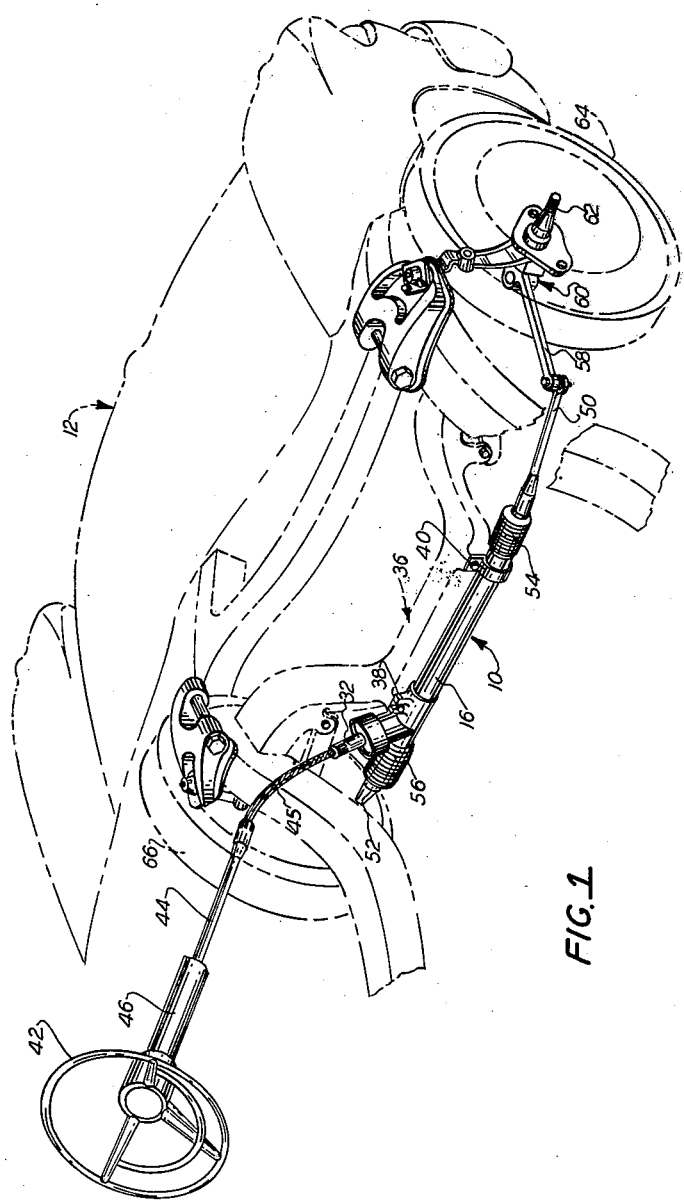
FIG. 1 is a view showing the steering mechanism of the present invention mounted in an automotive vehicle.

Referring now to the drawings in which like reference numerals designate like parts throughout the several views thereof, there is shown in FIG. 1, a steering mechanism of the present invention, generally designated by the numeral 10, positioned in a motor vehicle shown in phantom form and generally designated by the numeral 12. As can best be seen by reference to FIG. 2, the steering mechanism 10 includes a steering rod 14 slidably positioned within a housing 16 by means of bearing 18 located adjacent one end of the rod and by means of a similar bearing (not shown) positioned adjacent the other end of the rod. The steering rod 14 includes a rack portion 22 at one end thereof for engagement with a pinion gear 24 which is positioned within a reduction gear housing 26. The rod also has a stop member 20 affixed thereto by means of a snap ring.

The reduction gear housing 26 carries a planetary reduction gear train, generally designated by the numeral 28, and this gear train includes a sun gear 30 affixed or formed integrally with an input shaft 32.

The reduction gear housing 26 includes a portion 34 which receives the steering rod housing 16, and this portion of the housing is affixed to a frame crossmember 36 of automotive vehicle 12 by means of bolts, one of which is shown at 38. The steering rod housing 16 is also affixed to this crossmember by means of a bracket 40.

The input shaft 32 to the planetary gear train 28 is connected to a steering wheel 42 through any suitable means, preferably a steering wheel shaft 44 and a flexible cable 45. The flexible cable may be connected to the steering wheel shaft and to the input shaft 32 by means of swaging. The steering wheel shaft 44 may be suitably mounted in a steering column tube 46 which in turn may be suitably affixed to the vehicle by any conventional means (not shown).

The steering rod 14 includes a threaded bore at each end thereof, one of which is shown at 48. One end of a ball joint assembly, preferably the housing, is threaded into each of the threaded bores. A pair of steering links 50 and 52 are connected to the other end of the ball joint assemblies, the ball parts. These ball joint assemblies have not been shown in the drawings, but it is understood that any conventional ball joint assemblies will suffice. Thus, the ball joint asemblies connect the steering rod 14 with a pair of steering links 50 and 52, and these ball joint assemblies are covered by a pair of suitable flexible boots 54 and 56. The steering link 50 is connected to a knuckle arm 58 which in turn is connected to a steering knuckle 60. The steering knuckle 60 includes a spindle 62 which rotatably supports a dirigible or steerable wheel 64 of the motor vehicle. The motor vehicle also includes a second dirigible or steerable wheel 66 which is connected to steering link 52 through another knuckle arm, steering knuckle and spindle (not shown).

The planetary reduction gear set 28 includes the sun gear 30 affixed to the input shaft 32, a ring gear 70 positioned within the reduction gear housing 26 and a plurality of planet gears, designated by the numerals 72, 74 and 76. The ring gear is restrained from rotation by a pair of pins 78 and 80 which are received within grooves 82 and 84 in the housing 26 and grooves 86 and 88 in the ring gear. The panet gears 72, 74 and 76, are rotatably positioned upon a planet carrier 90 by means of pins 92, 94 and 96. The planet carrier 90 may be integrally formed with the pinion 24.

The sun gear 30 of the planetary gear set is held within housing 26 by means of a cover 100 that in turn is held in place by a snap spring 102. The cover positions a thrust washer 104 against the sun gear 30 and also positions a sealer material 106 against the input shaft 32. The planet carrier 90, including the pinion 24, is rotatably mounted within the housing 26 and any thrust loads are taken by a thrust washer 108 and by a thrust washer 110. Thrust washer 110 is positioned against the outer end of the housing by a snap ring 112 positioned in an annular channel 114 in the planet carrier. A cap 116 of any suitable material may be positioned over the end of the housing 26. The input shaft 32, including sun gear 30, is rotatably supported within the planet carrier by means of a sleeve bearing 120 positioned adjacent the sun gear and by being received within a portion 122 of the planet carrier positioned adjacent the cap 116.

The rack portion 22 of the steering rod 14 is received in a sliding fit relationship in a protuberance 124 in the housing 26 and, therefore, is forced into engagement with the pinion 24. The rack may include an insert 126 for eliminating lash between the rack 22 and the pinion 24. This subject matter is more fully described in co-pending application Serial No. 35,806, filed June 13, 1960 in the name of Glenn A. Ulrich, entitled, Anti-Lash Device, and assigned to the assignee of the present invention.

The present invention includes means for eliminating the lash from the planetary gear set 28. This means includes a planet gear, designated by the numeral 130 in FIG. 3. This planet gear is rotatably mounted upon a pin 132 that is carried in the planet carrier 90. The planet gear 130 is arranged and constructed to produce an interference fit with the ring gear 70 and the sun gear 30. It is preferably constructed of a non-metallic material which is capable of substantial elastic deformation and which has a substantially smaller modulus of elasticity and rigidity than the material of the remainder of the gears in the gear train. For example, the planet gear 130 may be constructed of nylon while the remainder of the gears may be constructed of steel.

In the preferred embodiment of the lash eliminating means of this invention, as shown in FIGS. 3, 5 and 6, the planet gear 130 is constructed of nylon and has a helix angle different from the helix angle of the sun gear 30, the ring gear 70, and the remainder of the planet gears 72, 74 and 76. As illustrated in FIGS. 3, 5 and 7, the sun gear, the ring gear and the remainder of the planet gears are straight spur gears, while the nonmetallic or nylon planet gear 130 is a helical gear having a small helix angle, for example, 1° or 1° and 30 minutes. The nonmetallic helical gear 130 is shown in elevation in FIG. 6 with a perceptible helix angle.

Another embodiment of the lash eliminating means of the present invention is shown in FIGS. 8 and 9, and includes a planet gear 140 which may be constructed of the same material as that employed in the construction of planet gear 130, preferably nylon. This planet gear includes a hub 142 which is separated from the teeth of the gear by means of an annular space 144. The gear 140 may be a straight spur gear having an oversized pitch diameter in relation to the distance between the ring gear 70 and the sun gear 30. The portion of the gear carrying the teeth may, therefore, deflect into the annular space 144 as opposing teeth mesh with the ring gear and the sun gear respectively.

Another embodiment of the lash eliminating means of the present invention is shown in FIGS. 10 and 11. In this embodiment a planet gear 150 that is constructed of the same material as that employed in the construction of planet gears 130 and 140, preferably nylon, includes two sets of axially spaced teeth 153 and 154 which are circumferentially offset from each other, as shown in FIG. 10. These sets of teeth are joined by a hub portion 156.

The embodiments of the invention shown in FIGS. 8 and 9 and in FIGS. 10 and 11, are also employed with the planetary gear train shown in FIG. 3. The only difference is that the planet gears 140 and 150, respectively, are substituted for the planet gear 130.

The lash eliminating means for the planetary gear set shown in FIGS. 3, and 5 through 6, eliminates the lash in the planetary gear set by forcing the teeth of the planet gears into engagement with the teeth of the sun gear and ring gear. As the helical gear 130 is forced into position during assembly, the teeth in engagement with the ring gear 70 and the sun gear 30 force the gears into proper engagement in which no lash is present. For light loads, the planet gear 130, constructed of the material capable of substantial elastic deformation, carries the load between the input and output to the gear train, while for heavier loads the gear 130 deforms sufficiently to permit the other planet gears 72, 74 and 76 to carry the load. The embodiment of the invention shown in FIGS. 10 and 11 functions in a similar manner to the embodiment shown in FIGS. 3, and 5 through 7, while the embodiment shown in FIGS. 8 and 9 accomplishes a tight mesh between the teeth of this gear and the teeth of the sun gear and the ring gear by deforming diametrically. All of the embodiments of the invention depend for their antilash action upon an interference between the teeth of the planet gear 130, 140, or 150 and the teeth of the sun gear and ring gear.

As explained previously, the planetary reduction gear train may be employed with a steering mechanism of a motor vehicle, and in this instance the lash eliminating means described above provides the advantage of eliminating play in the steering wheel, and assists in preventing road shocks and other vibrations from being transmitted from the steerable or dirigible wheels back to the steering wheel of the vehicle.

When the steering wheel 42 is turned, the input shaft 32 and sun gear 30 are rotated by means of the steering wheel shaft 44 and the flexible cable 45. This rotational motion is reduced by the planetary gear train 28 previously described and is transmitted to the rack 22 by the pinion 24. The rack and pinion gear set converts the rotary motion to linear motion and this linear motion is transmitted to the steerable wheels 64 and 66 of the motor vehicle through the steering rod 14, links 50 and 52, and the knuckle arms, steering knuckles and spindles, one set of which have been designated by the numerals 58, 60 and 62. During high speed operation of the vehicle, when a small amount of corrective steering is necessary, the steering effort needed to turn the wheels 64 and 66 is quite small, and the planet gear 130, or 140 or 150, depending upon the embodiment of the invention employed, is capable of transmitting the torque applied to the steering wheel to the pinion 24 and to the rack 22. When larger steering efforts are necessary, the planet gear 130, 140 or 150 deforms sufficiently to permit the other planet gears 72, 74 and 76 to transmit the load from the steering wheel to the rack and pinion.

Excessive movement of the rod 14 in one direction, during steering operations, is prevented by the engagement of stop 20 with the sleeve-like projection of the portion 34 of housing 26. Excessive movement in the other direction is prevented by engagement of the housing of the ball joint assembly affixed to the end of the rod adjacent the rack 22 with housing 26.

Although the lash eliminating means of this invention is shown and described in relation to a manual steering mechanism for an automotive vehicle, it may be employed equally well with a power steering mechanism.

The present invention thus provides a means for eliminating lash in a planetary gear train, and further provides a steering mechanism for an automotive vehicle in which lash is eliminated from the gear train employed.

It will be understood that the invention is not to be limited to the exact construction shown and described but that various changes and modifications may be made without departing from the spirit and scope of the invention as defined in the appended claims.

1. A planetary gear train comprising, a sun gear, a ring gear and a plurality of planet gears meshing with said sun gear and said ring gear, one of said planet gears being constructed of a material capable of elastic deformation and having a modulus of rigidity substantially smaller than the modulus of rigidity of said sun gear, said ring gear and the remainder of said planet gears, said one of said planet gears having an interference fit with said sun gear and said ring gear for eliminating lash in the planetary gear train.

2. A planetary gear train comprising, a sun gear, a ring gear, and a plurality of planet gears meshing with said sun gear and said ring gear, one of said planet gears being constructed of a material capable of elastic deformation and having a modulus of rigidity substantially smaller than the modulus of rigidity of the material of the sun gear, the ring gear and the remainder of said planet gears, said one of said planet gears having a helix angle different from the helix angle of said sun gear, said ring gear and the remainder of said planet gears.

3. A planetary gear train comprising, a sun gear, a ring gear and a plurality of planet gears meshing with said sun gear and said ring gear, one of said planet gears being constructed of a material capable of elastic deformation and having a substantially smaller modulus of elasticity than the material of the remainder of said gears, said one of said planet gears being capable of diametral expansion and contraction and having an oversized pitch diameter in relation to the distance between said sun gear and said ring gear.

4. A planetary gear train comprising, a sun gear, a ring gear and a plurality of planet gears, one of said planet gears being constructed of a material capable of elastic deformation and having a modulus of rigidity substantially smaller than the material of said sun gear, said ring gear and the remainder of said planet gears, said one of said planet gears having two sets of teeth axially spaced from one another, one of said sets of teeth being circumferentially offset with respect to the other set of teeth.

5. A steering gear mechanism for an automotive vehicle comprising input and output shafts, a steering wheel adapted to be connected to said input shaft, means adapted to be connected to the steerable wheels of the vehicle coupled to said output shaft, a planetary gear set including a sun gear, a ring gear and a plurality of planet gears coupling said input shaft and said output shaft, one of said planet gears being constructed of a material capable of elastic deformation and having a modulus of rigidity substantially less than the modulus of rigidity of the material of the remainder of the gears in the planetary gear set, said one of said planet gears engaging said sun and ring gears in an interference fit relationship for eliminating lash in said planetary gear train.

6. A steering gear mechanism for an automotive vehicle comprising input and output shafts, a steering wheel adapted to be connected to said input shaft, means adapted to be connected to the steerable wheels of the vehicle coupled to said output shaft, a planetary gear set including a sun gear, a ring gear and a plurality of planet gears coupling said input and said output shafts, one of said planet gears being constructed of a material that is capable of elastic deformation and having a modulus of rigidity substantially smaller than the modulus of rigidity of the material of said gun gear, said ring gear and the remainder of said planet gears, said one of said planet gears having a helix angle different from the helix angle of said sun gear, said ring gear, and the remainder of said planet gears.

7. A steering gear mechanism for an automotive vehicle comprising input and output shafts, a steering wheel adapted to be connected to said input shafts, means adapted to be connected to the steerable wheels of the vehicle coupled to said output shaft, a planetary gear set including a sun gear, a ring gear and a plurality of planet gears coupling said input shaft and said output shaft, one of said planet gears being constructed of nylon and having a helix angle different from the helix angle of said sun gear, said ring gear and the remainder of said planet gears.

8. A steering gear mechanism for an automotive vehicle comprising input and output shafts, a steering wheel adapted to be connected to said input shaft, means adapted to be connected to the steerable wheels of the vehicle coupled to said output shaft, a planetary gear set including a sun gear, a ring gear and a plurality of planet gears coupling said input shaft and said output shaft, one of said planet gears being constructed of a material capable of substantial elastic deformation, said one of said planet gears being capable of diametral expansion and contraction and having an oversized pitch diameter in relation to the distance between said sun gear and said ring gear.

9. A steering gear mechanism for an automotive vehicle comprising input and output shafts, a steering wheel adapted to be connected to said input shaft, means adapted to be connected to the steerable wheels of the vehicle coupled to said output shaft, a planetary gear set including a sun gear, a ring gear and a plurality of planet gears coupling said input shaft and said output shaft, one of said planet gears being constructed of a material capable of elastic deformation, and having a modulus of rigidity substantially smaller than the modulus of rigidity of said sun gear, said ring gear and the remainder of said planet gears, said one of said planet gears having two sets of teeth axially spaced from one another, one of said sets of teeth being circumferentially offset with respect to the other set of teeth.

10. A planetary gear train comprising a sun gear, a ring gear and a plurality of planet gears meshing with said sun gear and said ring gear, one of said planet gears being capable of substantially more deformation than the remainder of the gears and engaging said sun gear and said ring gear in an interference fit relationship for eliminating lash in the planetary gear train.

References Cited in the file of this patent

UNITED STATES PATENTS

| | | |
|---|---|---|
| 837,528 | Wilson | Dec. 4, 1906 |
| 2,764,034 | Hotine | Sept. 25, 1956 |
| 2,845,809 | Hetzel | Aug. 5, 1958 |